(12) United States Patent
Kawai

(10) Patent No.: US 9,961,320 B2
(45) Date of Patent: May 1, 2018

(54) IMAGE DISPLAY APPARATUS AND CONTROL METHOD THEREOF

(71) Applicant: CANON KABUSHIKI KAISHA, Tokyo (JP)

(72) Inventor: Yoshikazu Kawai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 14/928,135

(22) Filed: Oct. 30, 2015

(65) Prior Publication Data

US 2016/0134856 A1 May 12, 2016

(30) Foreign Application Priority Data

Nov. 7, 2014 (JP) ................ 2014-227069
Mar. 26, 2015 (JP) ................ 2015-065058
Aug. 28, 2015 (JP) ................ 2015-169047

(51) Int. Cl.
| H04N 5/77 | (2006.01) |
| H04N 9/79 | (2006.01) |
| H04N 9/806 | (2006.01) |

(52) U.S. Cl.
CPC ............. *H04N 9/7904* (2013.01); *H04N 5/77* (2013.01); *H04N 9/806* (2013.01)

(58) Field of Classification Search
CPC .......... H04N 5/77; H04N 9/09; H04N 9/7904; H04N 9/806; H04N 9/802
USPC ....................................... 386/224
See application file for complete search history.

(56) References Cited

U.S. PATENT DOCUMENTS

| 9,398,247 B2 * | 7/2016 | Tateishi | H04N 21/42203 |
| 2002/0136531 A1 * | 9/2002 | Harradine | G06Q 30/02 386/239 |
| 2006/0176865 A1 * | 8/2006 | Cho | H04W 52/143 370/338 |
| 2006/0232919 A1 * | 10/2006 | Jeong | H05K 7/20972 361/679.22 |
| 2013/0121660 A1 * | 5/2013 | Shinoki | H04N 5/77 386/224 |
| 2014/0329567 A1 * | 11/2014 | Chan | H04M 1/605 455/569.2 |

(Continued)

FOREIGN PATENT DOCUMENTS

| JP | 2001-168646 A | 6/2001 |
| JP | 2004-282795 A | 10/2004 |
| JP | 2007-004872 A | 1/2007 |

*Primary Examiner* — Thai Tran
*Assistant Examiner* — Jose Mesa
(74) *Attorney, Agent, or Firm* — Fitzpatrick Cella Harper & Scinto

(57) ABSTRACT

The image display apparatus is connected, directly or via a recording apparatus, to an image capturing apparatus, and includes a first acquisition unit configured to acquire recording process information on an image recording process for recording, with the image capturing apparatus or the recording apparatus, moving image data generated by capturing an object with the image capturing apparatus and audio data representing audio that is input to a microphone during a shooting period of the moving image data, and a reduction unit configured to execute a sound reduction process for reducing a sound output from the image display apparatus, in a case where the image recording process is executed, based on the recording process information.

23 Claims, 12 Drawing Sheets

(56) References Cited

U.S. PATENT DOCUMENTS

2015/0185824 A1* 7/2015 Mori .................. G06F 3/01
　　　　　　　　　　　　　　　　　345/156

* cited by examiner

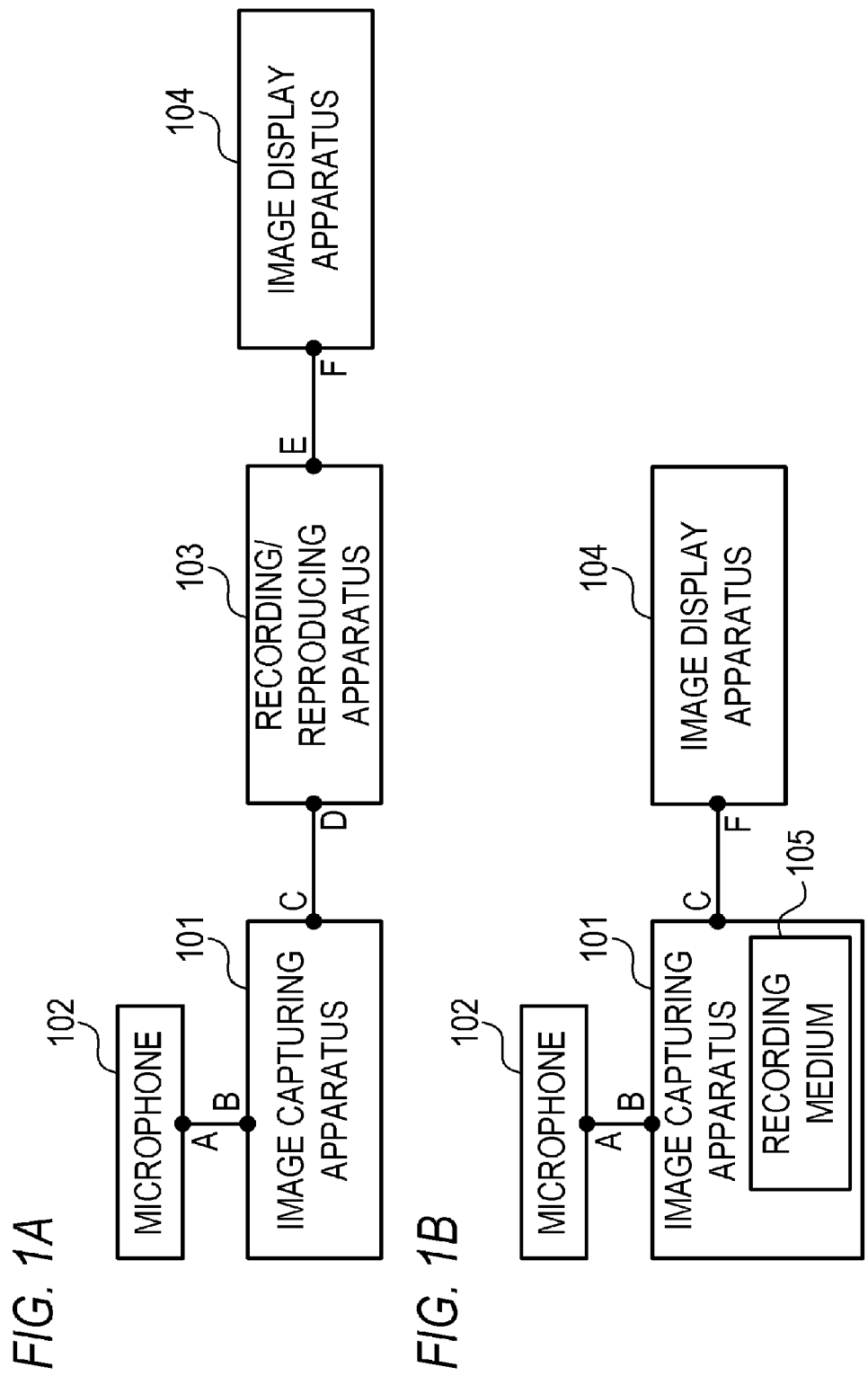

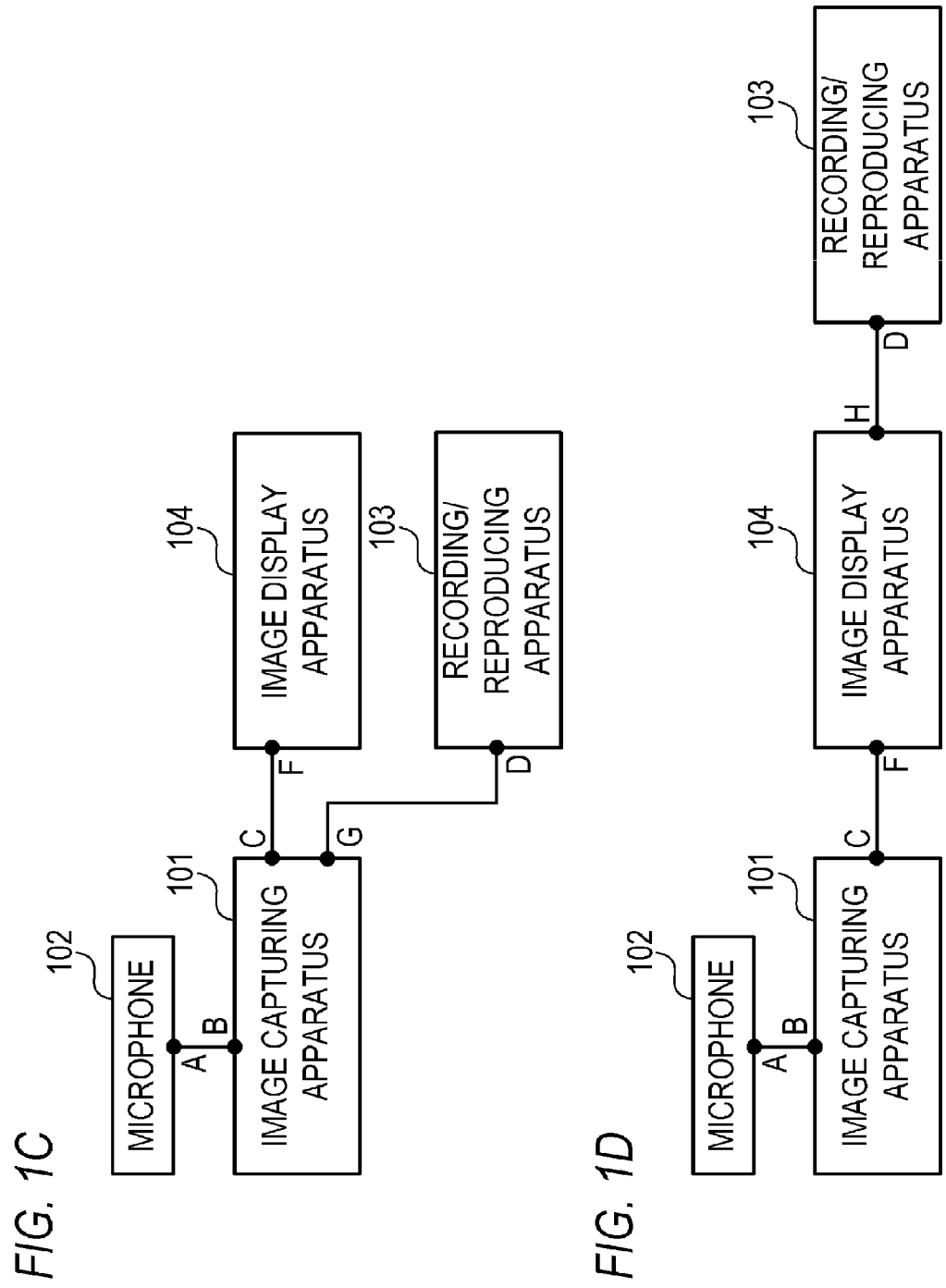

IMAGE DISPLAY APPARATUS AND CONTROL METHOD THEREOF

BACKGROUND OF THE INVENTION

Field of the Invention

The present invention relates to an image display apparatus and a control method thereof.

Description of the Related Art

Lately, digital video cameras have been used more frequently than film cameras to capturing. Furthermore, workflows using digital image data (file-based workflows) in the various steps of image production (the shooting step, developing step, editing step, etc.) have been increasingly popular as image production workflows.

In the shooting step in a file-based workflow, non-compressed image data such as RAW image data and Log image data are output from an image capturing apparatus (camera). In the developing step following the shooting step, the image data that is output from the camera is subjected to image processing called "grading." Grading is an image process such as a process for changing the gradation value of image data in accordance with the gamma characteristic of an image display apparatus displaying an image based on the image data, and a process for resembling the color of an object represented by image data, as a color to be perceived by a human viewing the object.

In the past the developing step was generally performed at different times and places than the shooting step. However, with the improvement on the performances of the devices and reduction in the sizes of the devices, grading is more and more employed at the same places as the shooting step. Checking the image, or the result of grading, has also been performed more frequently at the same places as the shooting step. The grading that is executed at the same places as the shooting step is described hereinafter as "onset grading" as distinguished from the grading that is executed at the different places than the shooting step.

For the purpose of recording moving image data that is generated as a result of capturing an object with the image capturing apparatus, audio data representing the audio output from the object during the generation of the moving image data is generally recorded at the same time. In so doing, the electronic device used for the onset grading (a personal computer, an image display apparatus, etc.) and the electronic device used for checking the result of the onset grading (an image display apparatus) are often used in the proximity of the image capturing apparatus. For this reason, there arises a risk that the audio data representing the sounds of the image display apparatuses (the image display apparatus used in the onset grading and the image display apparatus used for checking the result of the onset grading) as noise are recorded as well.

Japanese Patent Application Laid-open No. 2007-4872 discloses a recording apparatus for recoding audio data. The recording apparatus disclosed in Japanese Patent Application Laid-open No. 2007-4872 stops the rotation of the fan thereof in a case where starting to record audio data. However, this recording apparatus is not necessarily integrated with an image display apparatus. The technique disclosed in Japanese Patent Application Laid-open No. 2007-4872, therefore, can only reduce the sound of the recording apparatus recording audio data but cannot reduce the sound of the image display apparatus.

Japanese Patent Application Laid-open No. 2001-168646 discloses a controller for controlling the rotational speed of the fan that cools the amplifier amplifying the level of audio data (audio level). The controller disclosed in Japanese Patent Application Laid-open No. 2001-168646 reduces the rotational speed of the fan during a mute period in which the amplifier forcibly reduces the audio level. However, the audio data is not necessarily recorded during the mute period. Therefore, the technique disclosed in Japanese Patent Application Laid-open No. 2001-168646 has a risk that it records the audio data representing the sound of the image display apparatus as noise.

SUMMARY OF THE INVENTION

The present invention provides a technique that is capable of properly and effectively executing a process for reducing the sound output from an image display apparatus.

The present invention in its first aspect provides an image display apparatus that is connected, directly or via a recording apparatus, to an image capturing apparatus, the image display apparatus comprising:

a first acquisition unit configured to acquire recording process information on an image recording process for recording, with the image capturing apparatus or the recording apparatus, moving image data generated by capturing an object with the image capturing apparatus and audio data representing audio that is input to a microphone during a shooting period of the moving image data; and a reduction unit configured to execute a sound reduction process for reducing a sound output from the image display apparatus, in a case where the image recording process is executed, based on the recording process information.

The present invention in its second aspect provides an image display apparatus, comprising:

an acquisition unit configured to acquire shooting time information representing a shooting time of image data generated by capturing an object with an image capturing apparatus; and a reduction unit configured to execute a sound reduction process for reducing a sound output from the image display apparatus, based on the shooting time information acquired by the acquisition unit, wherein as shooting time information on moving image data, the acquisition unit acquires, for each of frames of the moving image data, shooting time information representing a shooting time of the frame, and the reduction unit executes the sound reduction process in a case where the shooting time that is represented by the shooting time information acquired by the acquisition unit is updated sequentially and different from a current time.

The present invention in its third aspect provides a control method for an image display apparatus that is connected, directly or via a recording apparatus, to an image capturing apparatus, the control method comprising:

an acquisition step of acquiring recording process information on an image recording process for recording, with the image capturing apparatus or the recording apparatus, moving image data generated by capturing of an object with the image capturing apparatus and audio data representing audio that is input to a microphone during a shooting period of the moving image data; and a reduction step of executing a sound reduction process for reducing a sound output from the image display apparatus, in a case where the image recording process is executed based on the recording process information.

The present invention in its fourth aspect provides a control method for an image display apparatus, comprising:

an acquisition step of acquiring shooting time information representing a shooting time of image data generated by capturing an object with an image capturing apparatus; and a reduction step of executing a sound reduction process for reducing a sound output from the image display apparatus, based on the shooting time information acquired in the acquisition step, wherein as shooting time information on moving image data, the acquisition step acquires, for each of frames of the moving image data, shooting time information representing a shooting time of the frame, and the reduction step executes the sound reduction process in a case where the shooting time that is represented by the shooting time information acquired in the acquisition step is updated sequentially and different from a current time.

The present invention in its fifth aspect provides a non-transitory computer readable medium that stores a program, wherein the program causes a computer to execute one of these control methods for the image display apparatus.

The present invention can properly and effectively execute the process for reducing the sound output from the image display apparatus.

Further features of the present invention will become apparent from the following description of exemplary embodiments with reference to the attached drawings.

BRIEF DESCRIPTION OF THE DRAWINGS

FIGS. 1A to 1D are each a diagram showing a configuration example of a control system according to Embodiment 1;

DESCRIPTION OF THE EMBODIMENTS

Embodiment 1

Figure 2:
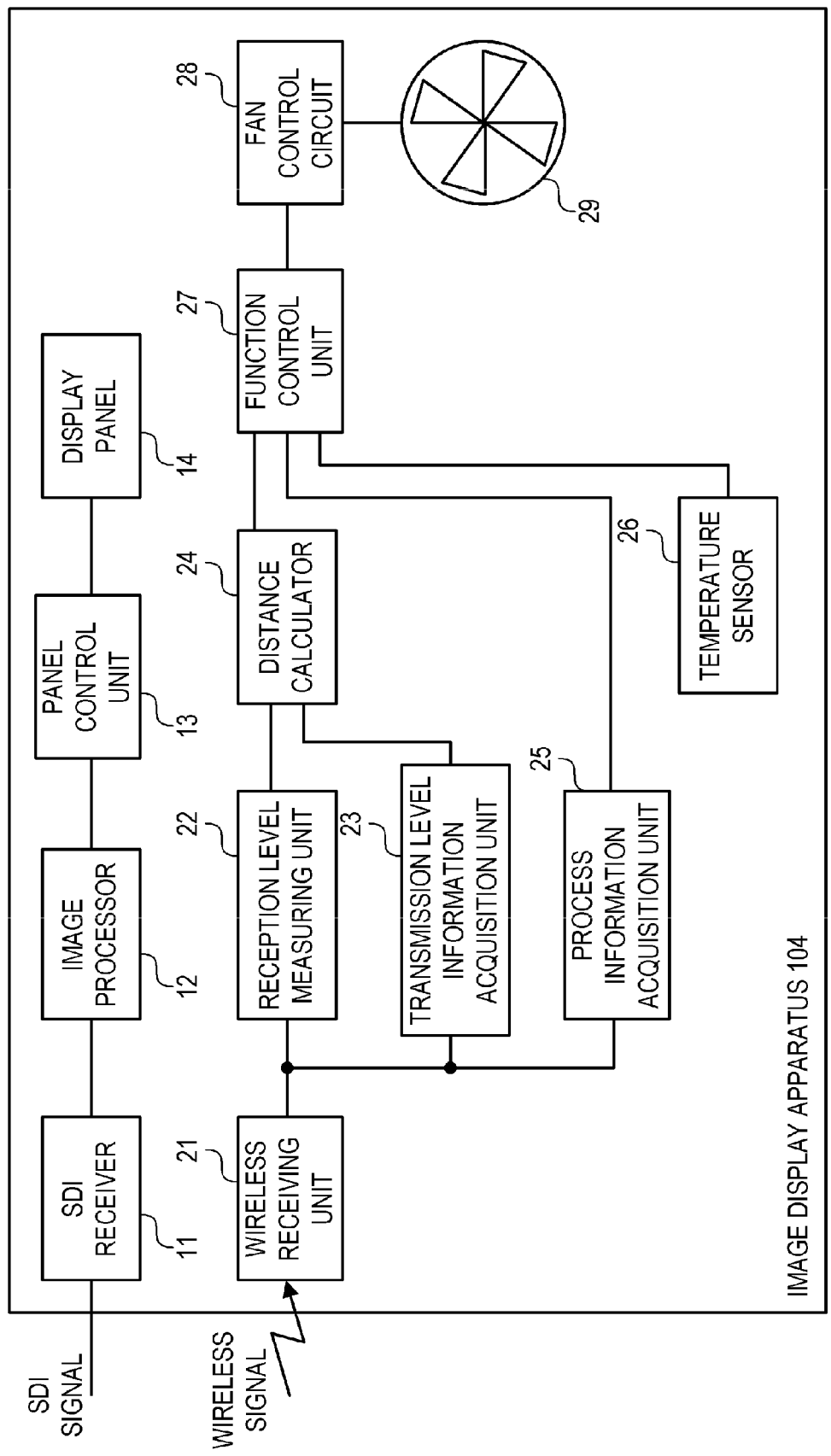
FIG. 2 is a block diagram showing an example of the configuration of an image display apparatus according to Embodiment 1.

An image display apparatus and a control method thereof according to Embodiment 1 of the present invention are now described hereinafter. The present invention can be applied to any image display apparatus such as a liquid crystal display apparatus, an organic EL display apparatus, and a plasma display apparatus.

FIG. 1A is a diagram showing a configuration example of a control system according to the present embodiment. The control system shown in FIG. 1A is used in, for example, onset grading. Onset grading is performed at the same place as the shooting step. Grading is an image process such as a process for changing the gradation value of image data in accordance with the gamma characteristic of an image display apparatus displaying an image based on the image data, and a process for resembling the color of an object represented by image data, as a color to be perceived by a human viewing the object. As shown in FIG. 1A, the control system according to the present embodiment has an image capturing apparatus 101, a microphone 102, a recording/reproducing apparatus 103, and an image display apparatus 104.

The image capturing apparatus 101 generates image data (still image data or moving image data) by capturing (shooting; imaging) an object.

The microphone 102 generates audio data representing audio that is input to the microphone 102. For instance, audio output from an object during the shooting period of the image capturing apparatus 101 is input to the microphone 102. The microphone 102 is often placed in the proximity of the image capturing apparatus 101. The microphone 102 may be integrated with the image capturing apparatus 101.

The recording/reproducing apparatus 103 functions as a recorder for recording image data and audio data that are input to the recording/reproducing apparatus 103 and as a reproducer for reproducing the recorded image data and audio data. The recording/reproducing apparatus 103 may be integrated with the image capturing apparatus 101.

The image display apparatus 104 displays an image based on image data input to the image display apparatus 104.

An input terminal B of the image capturing apparatus 101 and an output terminal A of the microphone 102 are connected to each other, so the audio data generated with the microphone 102 is input to the image capturing apparatus 101 through the output terminal A and the input terminal B.

An output terminal C of the image capturing apparatus 101 and an input terminal D of the recording/reproducing apparatus 103 are connected to each other, so the image data generated with the image capturing apparatus 101 and the audio data input to the image capturing apparatus 101 are input to the recording/reproducing apparatus 103 through the output terminal C and the input terminal D.

The image capturing apparatus 101 can control the operations of the recording/reproducing apparatus 103. In response to an instruction from the image capturing apparatus 101, the recording/reproducing apparatus 103, for instance, records the image data and audio data that are input to the recording/reproducing apparatus 103 and reproduces the recorded image data and audio data. An instruction on recording and reproducing data, too, is input from the image capturing apparatus 101 to the recording/reproducing apparatus 103 through the output terminal C and the input terminal D. The image data and audio data are recorded in a storage medium such as a hard disk drive (HDD) or solid state drive (SSD). The storage medium may be provided in the recording/reproducing apparatus 103 or in isolation from the recording/reproducing apparatus 103.

The image capturing apparatus 101 has a wireless transmission unit that outputs a wireless signal. A wireless LAN module capable of transmitting/receiving wireless signals can be used as the wireless transmission unit.

An output terminal E of the recording/reproducing apparatus 103 and an input terminal F of the image display apparatus 104 are connected to each other, so the image data is input from the recording/reproducing apparatus 103 to the image display apparatus 104 through the output terminal E and the input terminal F. For instance, in a case where the image data stored in the recording/reproducing apparatus 103 (the storage medium) is reproduced, the reproduced image data is input to the image display apparatus 104. In other cases, the image data that is input to the recording/reproducing apparatus 103 is input to the image display apparatus 104. The present embodiment describes an example in which the recording/reproducing apparatus 103 outputs a serial digital interface (SDI) signal containing image data to the image display apparatus 104. It should be noted that the standard of signals output from the recording/reproducing apparatus 103 to the image display apparatus 104 is not particularly limited.

Although FIG. 1A illustrates the configuration in which the image capturing apparatus 101 is connected to the image display apparatus 104 via the recording/reproducing apparatus 103 therebetween, the output terminal C of the image capturing apparatus 101 may be connected directly to the input terminal F of the image display apparatus 104 in a case where the image capturing apparatus 101 is equipped with the functions of the recording/reproducing apparatus 103, as shown in FIG. 1B. In such a case, the image capturing apparatus 101 includes a recording medium (memory) 105 capable of recoding image data. The recording medium (memory) 105 may be an attached hard disk, a portable compact flash (CF) memory card, a secure digital (SD) memory card, or the like.

Moreover, as shown in FIG. 1C, the recording/reproducing apparatus 103 and the image display apparatus 104 may be connected to the image capturing apparatus 101. In this case, the output terminal C of the image capturing apparatus 101 and the input terminal F of the image display apparatus 104 are connected directly to each other, and an output terminal G of the image capturing apparatus 101 and the input terminal D of the recording/reproducing apparatus 103 are connected to each other.

Also, a configuration shown in FIG. 1D is possible in which the image capturing apparatus 101 is connected to the recording/reproducing apparatus 103 via the image display apparatus 104 therebetween. In this case, the output terminal C of the image capturing apparatus 101 and the input terminal F of the image display apparatus 104 are connected to each other, and an output terminal H of the image display apparatus 104 and the input terminal D of the recording/reproducing apparatus 103 are connected to each other. The image display apparatus 104 may output the image data, which is input from the image capturing apparatus 101, directly to the recording/reproducing apparatus 103, or may output the image data to the recording/reproducing apparatus 103 after a developing process, a decoding process or the like is performed on the image data.

FIG. 2 is a block diagram showing an example of the configuration of the image display apparatus 104.

An SDI receiver 11 decodes the SDI signal that is input to the image display apparatus 104, and then outputs the decoded SDI signal to an image processor 12.

The image processor 12 performs predetermined image processing on the image data that is included in the SDI signal output from the SDI receiver 11, and outputs the resultant, processed image data to a panel control unit 13.

The predetermined image processing is, for example, the onset grading described above. The panel control unit 13 drives a display panel 14 in response to the image data output from the image processor 12. For example, the panel control unit 13 drives each of the display elements of the display panel 14 at a drive voltage and drive timing in accordance with the image data output from the image processor 12.

The display panel 14 displays an image based on the image data input to the image display apparatus 104. Specifically, the display panel 14 is driven by the panel control unit 13 and thereby displays, on a screen, an image corresponding to the image data output from the image processor 12.

A wireless receiving unit 21 receives a wireless signal transmitted from the image capturing apparatus 101. In the present embodiment, a wireless signal having a packet in which transmission level information and process information are stored is transmitted from the image capturing apparatus 101. The process information includes recording process information and reproduction process information. Therefore, the wireless receiving unit 21 executes a process for acquiring the transmission level information (a third acquisition process), a process for acquiring the recording process information (a first acquisition process), and a process for acquiring the reproduction process information (a sixth acquisition process). The transmission level information represents a transmission level, a level of a wireless signal (power) at timing when the wireless signal is transmitted by the image capturing apparatus 101.

The recording process information is information on an image recording process for recording moving image data generated as a result of capturing an object with the image capturing apparatus 101 and audio data representing audio that is input to the microphone 112 during the period in which the moving image data is obtained. For instance, the recording process information indicates an execution state of the image recording process. Specifically, the recording process information is information on whether the image recording process is being executed or not, information on whether the image recording process is started or not, information on whether the image recording process is ended or not, and the like. The recording process information may also indicate an instruction that is issued by the image capturing apparatus 101 to the recording/reproducing apparatus 103 to start or end the image recording process, or an instruction that is issued to the recording medium (memory) provided inside the image capturing apparatus 101 to start or end the image recording process.

The reproduction process information is information on an image reproduction process for inputting moving image data recorded by the image recording process to the image display apparatus 104. For example, the reproduction process information indicates an execution state of the image reproduction process. Specifically, the reproduction process information is information on whether the image reproduction process is being executed or not, information on whether the image reproduction process is started or not, information on whether the image reproduction process is ended or not, and the like. The reproduction process information may also indicate an instruction that is issued by the image capturing apparatus 101 to the recording/reproducing apparatus 103 to start or end the image recording process, or an instruction on starting or ending an image reproduction process for reading image data from the recording medium (memory) provided inside the image capturing apparatus 101 to reproduce the image data.

Note that at least any of the third acquisition process, the first acquisition process, and the sixth acquisition process may be executed by a function unit different from the wireless receiving unit 21. At least any of the transmission level information, the recording process information, and the reproduction process information may be acquired with a cable instead of wirelessly. At least any of the transmission level information, the recording process information, and the reproduction process information may be input to the image display apparatus 104 by a user. At least either the recording process information or the reproduction process information may be acquired from the recording/reproducing apparatus 103. In other words, the recording process information and the reproduction process information may be acquired directly or indirectly from the image capturing apparatus 101.

A reception level measuring unit 22 measures a reception level, a level of a wireless signal at timing when the wireless signal is received by the wireless receiving unit 21, and outputs the measurement result (reception level information on the reception level) to a distance calculator 24.

A transmission level information acquisition unit 23 extracts the transmission level information from the wireless signal received by the wireless receiving unit 21 and outputs the transmission level information to the distance calculator 24.

The distance calculator 24 acquires distance information on the distance between the image capturing apparatus 101 and the image display apparatus 104 (a second acquisition process). The distance calculator 24 outputs the distance information to a function control unit 27. In the present embodiment, the distance calculator 24 generates the distance information based on a ratio between the reception level represented by the reception level information and the transmission level represented by the transmission level information. Specifically, a wireless signal traveling distanced [m] is calculated as the distance between the image capturing apparatus 101 and the image display apparatus 104 by Equation 1 below. Equation 1 is the Friis transmission equation. In Equation 1, λ represents the wavelength [m] of the wireless signal, Gt represents the transmission gain of the wireless signal, Gr represents the reception gain of the wireless signal, Pt represents the transmission level [W] of the wireless signal, and Pr represents the reception level [W] of the wireless signal. The wavelength λ, transmission gain Gt and reception gain Gr are fixed values determined beforehand in accordance with the communication standard for wireless signals.

$$d=(\lambda \times (Gt \times Gr \times Pt)^{0.5})/(4 \times \pi \times Pr^{0.5})$$ (Equation 1)

A method for acquiring the distance information is not limited to the foregoing method. For instance, the distance information may be generated by using only the reception level as a variable without acquiring the transmission level information. Specifically, the distance d may be calculated by using a predetermined value as the transmission level Pt. Furthermore, the magnitude of the reception level may be used as the distance between the image display apparatus 104 and the image capturing apparatus 101. The distance between the image display apparatus 104 and the image capturing apparatus 101 may also be calculated with a global positioning system (GPS). The distance information may be input to the image display apparatus 104 by the user.

A process information acquisition unit 25 extracts the process information from the wireless signal received by the wireless receiving unit 21 and outputs the process information to the function control unit 27.

A temperature sensor 26 measures the internal temperature of the image display apparatus 104 and outputs the measurement result (temperature information representing the temperature) to the function control unit 27.

The function control unit 27 generates a control signal based on the distance information output from the distance calculator 24, the process information output from the process information acquisition unit 25, and the temperature information output from the temperature sensor 26. As will be described hereinafter in detail, the function control unit 27, if needed, generates a control signal that realizes a sound reduction process for reducing the sound output from the image display apparatus 104 (monitor sound). In a case where a fan 29 is rotated, the sound of the rotation of the fan 29 is the monitor sound. In the present embodiment, the function control unit 27 generates a control signal to realize a process for reducing the rotational speed of the fan 29, as the control signal for realizing the sound reduction process. The function control unit 27 outputs the generated control signal to a fan control circuit 28.

The fan control circuit 28 controls the rotational speed of the fan 29 in response to the control signal output from the function control unit 27.

The internal temperature of the image display apparatus 104 is reduced by the rotation of the fan 29.

Figure 3:
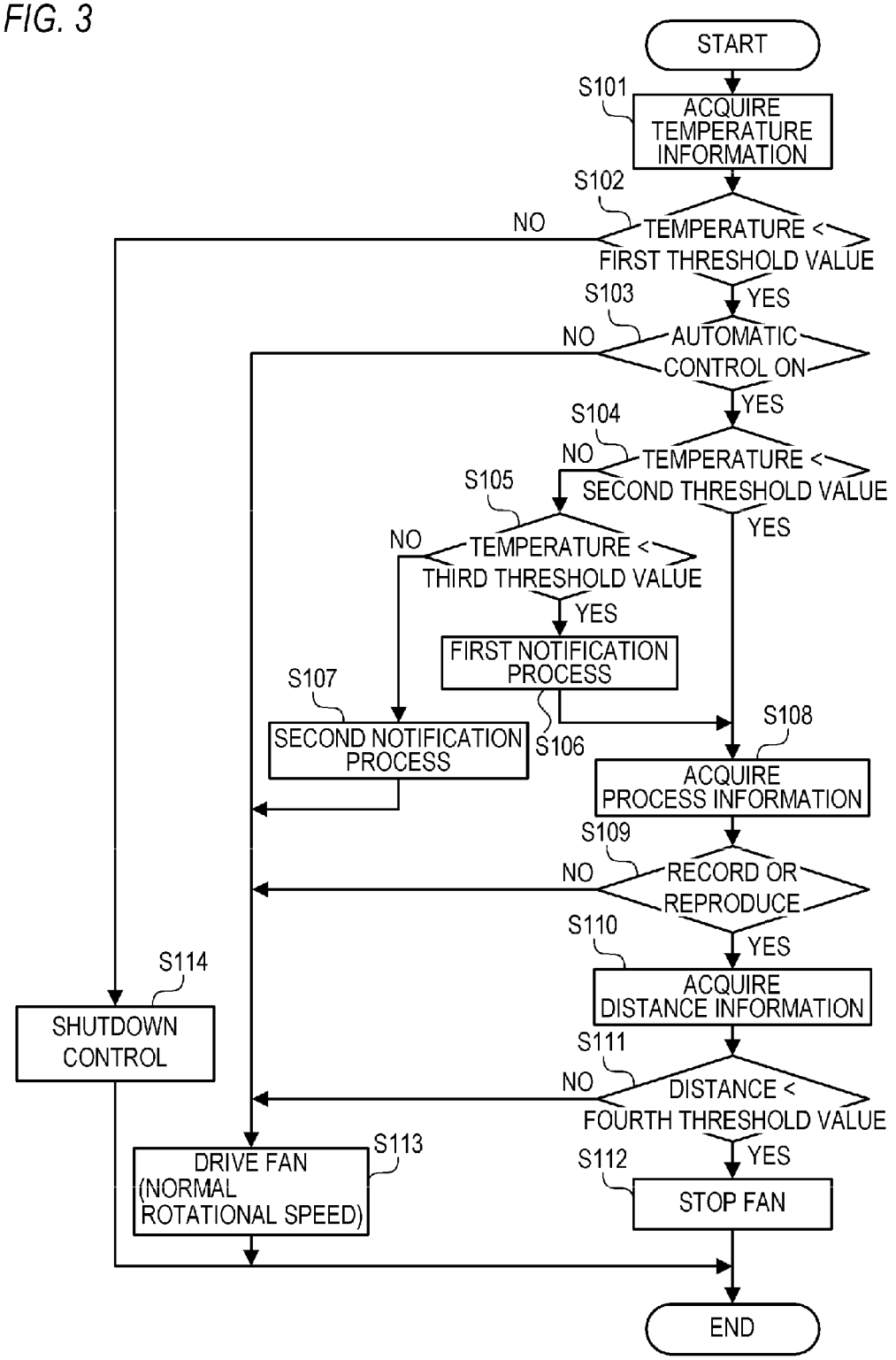
FIG. 3 is a flowchart showing an example of a flow of a process performed by a function control unit according to Embodiment 1.

FIG. 3 is a flowchart showing an example of a flow of a process performed by the function control unit 27.

First, in S101, the function control unit 27 acquires the temperature information from the temperature sensor (S101). The process then proceeds to S102.

In S102, the function control unit 27 determines whether the temperature that is represented by the temperature information acquired in S101 is less than a first threshold value. In a case where the temperature is less than the first threshold value, the process proceeds to S103. In a case where the temperature is equal to or higher than the first threshold value, the process proceeds to S114. For example, a temperature that is extremely likely to cause failure in the image display apparatus 104 is used as the first threshold value.

In S114, because the internal temperature of the image display apparatus 104 is equal to or higher than the first threshold value, the function control unit 27 executes shutdown control to accomplish a forced shutdown of the image display apparatus 104. The execution of the process of S114 can prevent an increase in the internal temperature of the image display apparatus 104 from causing failure in the image display apparatus 104.

In S103, the function control unit 27 determines whether an operation mode in which fan control based on the distance information and the process information is executed (automatic fan control mode) is set or not. In a case where the automatic fan control mode is set, the process proceeds to S104. In a case where the automatic fan control mode is not set, the process proceeds to S113.

In S113, the function control unit 27 outputs a control signal for driving the fan 29 at a predetermined rotational speed (normal rotational speed). Consequently, the fan 29 is driven at the normal rotational speed. The process of S113 can inhibit an increase in the internal temperature of the image display apparatus 104, thus preventing the occurrence of failure in the image display apparatus 104.

In S104, the function control unit 27 determines whether the temperature that is represented by the temperature information acquired in S101 is less than a second threshold value or not. In a case where the temperature is less than the second threshold value, the process proceeds to S108. In a case where the temperature is equal to or higher than the second threshold value, the process proceeds to S105. For example, a temperature that is unlikely to cause failure in the image display apparatus 104 is used as the second threshold value.

In S105, the function control unit 27 determines whether the temperature that is represented by the temperature information acquired in S101 is less than a third threshold value or not. In a case where the temperature is less than the third threshold value, the process proceeds to S106. In a case where the temperature is equal to or higher than the third threshold value, the process proceeds to S107. For example, a temperature that is likely to cause failure in the image display apparatus 104 is used as the third threshold value.

The magnitude relationship among the first, second and third threshold values is as follows: "first threshold value>third threshold value>second threshold value." The first, second and third threshold values may each be a value determined beforehand by a manufacturer or the like or a value that can be changed by the user.

In S106, because the internal temperature of the image display apparatus 104 is equal to or higher than the second threshold value, the function control unit 27 executes a first notification process. The first notification process urges the user to execute a task for reducing the internal temperature of the image display apparatus 104. For instance, the first notification process displays, on the screen, a message that reads, "the internal temperature is high. Please turn the power off," "the internal temperature is high. Please lower the brightness of the screen," "the internal temperature will soon reach the normal fan operation starting temperature," or the like. Subsequently, the process proceeds to S108. The process of S106 can prevent the occurrence of failure in the image display apparatus 104 by urging the user to execute the task for reducing the internal temperature of the image display apparatus 104.

Note that the notification may be executed in a manner other than by image display described above. For example, the notification may be executed through audio outputting.

In S107, because the temperature of the image display apparatus 104 is equal to or higher than the third threshold value, the function control unit 27 executes a second notification process. The second notification process sends a notice of starting the fan control for driving the fan 29 at the normal rotational speed. For instance, the second notification process displays, on the screen, a message that reads, "the internal temperature has exceeded the specified value. The normal fan operation will be started," or the like. Subsequently, the process proceeds to S113. The process of S107 allows the user to understand the fact that the rotational speed of the fan 29 is returned to the normal rotational speed and why.

In S108, the function control unit 27 acquires the process information from the process information acquisition unit 25. Thereafter, the process proceeds to S109.

In S109, based on the process information acquired in S108, the function control unit 27 determines whether the image recording process or the image reproduction process is being executed or not. In a case where the image recording process is being executed, in some cases audio data that represents the monitor sound as noise is recorded. In a case where the image reproduction process is being executed, there is a high possibility that the user performs a checking task to check the reproduced moving image data, causing adverse effects on the checking task, with the monitor sound being recognized as noise. In a case where neither the image recording process nor the image reproduction process is being executed, it is considered that the monitor sound does not have adverse effects on various processes and tasks that use the control system according to the present embodiment. Therefore, in a case where the image recording process or the image reproduction process is being executed, the process proceeds to S110, and in a case where neither the image recording process nor the image reproduction process is being executed, the process proceeds to S113.

In S110, the function control unit 27 acquires the distance information from the distance calculator 24. Subsequently, the process proceeds to S111.

In S111, the function control unit 27 determines whether the distance that is represented by the distance information acquired in S110 (the distance between the image capturing apparatus 101 and the image display apparatus 104) is less than a fourth threshold value or not. In a case where the distance between the image capturing apparatus 101 and the image display apparatus 104 is short, audio data on a large monitor sound is recorded. However, in a case where the distance between the image capturing apparatus 101 and the image display apparatus 104 is sufficiently long, audio data on a monitor sound of a negligible level or audio data that does not represent a monitor sound can be recorded. Therefore, in a case where the distance is less than the fourth threshold value, the process proceeds to S112. In a case where the distance is equal to or greater than the fourth threshold value, the process proceeds to S113. For example, a distance by which can be obtained audio data representing the monitor sound within a permissible range, is used as the fourth threshold value. The fourth threshold value may be a value determined beforehand by a manufacturer or the like or a value that can be changed by the user.

In S112, the function control unit 27 outputs a control signal for realizing the sound reduction process. Specifically, the function control unit 27 outputs a control signal for stopping the driving of the fan 29. Stopping the driving of the fan 29 can prevent the monitor sound from having adverse effects on the processes and tasks.

Note that a control signal for driving the fan 29 at a rotational speed lower than the normal rotational speed may be used as the control signal for realizing the sound reduction process. The rotational speed of the fan 29 may controlled, in a continuous manner or a step-by-step manner, at a rotational speed that is lower in a case where the distance between the image capturing apparatus 101 and the image display apparatus 104 is long than that obtained in a case where the distance is short.

In S112, the sound reduction process may be executed only for a predetermined period of time, so that the temperature of the image display apparatus 104 is not increased significantly by the stoppage of the driving of the fan 29 or the decrease in the rotational speed thereof.

As described above, according to the present embodiment, the sound reduction process is executed in a case where the distance between the image capturing apparatus and the image display apparatus is less than the threshold value and the image recording process is executed. Also, according to the present embodiment, the sound reduction process is executed in a case where the image recording process is executed. The present embodiment, therefore, can execute the sound reduction process properly and effectively.

In a case where the distance between the image capturing apparatus and the image display apparatus is less than the threshold value and the image recording process is being executed, there is an extremely high possibility that audio data on a considerably loud monitor sound is recorded.

According to the present embodiment, however, the sound reduction process is executed in such a case, so audio data on a monitor sound of a negligible level or audio data that does not represent a monitor sound can be recorded.

Furthermore, in a case where the image reproduction process is being executed, there is an extremely high possibility that the monitor sound has adverse effects on the checking task described above. However, according to the present embodiment, the sound reduction process is executed in such a case, preventing a monitor sound from having adverse effects on the checking task.

In other cases, it is extremely unlikely that the monitor sound has adverse effects on the processes and tasks. According to the present embodiment, the sound reduction process is not executed in those cases, preventing unnecessary execution of the sound reduction process.

The present embodiment takes into consideration the internal temperature of the image display apparatus for the purpose of preventing an increase in the internal temperature of the image display apparatus from causing failure in the image display apparatus; however, the internal temperature of the image display apparatus does not have to be taken into consideration. For instance, the processes prior to S108 shown in FIG. 3 (i.e., the processes of S101 to S107 and the process of S114) may be omitted, and instead the processes subsequent to S108 shown in FIG. 3 (i.e., S108 to S113) may be executed.

The present embodiment has described the example in which the sound reduction process is executed in a case where the distance between the image capturing apparatus and the image display apparatus is less than the threshold value and the image reproduction process is executed; however, the present invention is not limited to this example. The adverse effects on the abovementioned checking task that can be caused by the monitor sound have nothing to do with the distance represented by the distance information. For this reason, in a case where the image reproduction process is being executed, the sound reduction process may be executed regardless of the distance between the image capturing apparatus and the image display apparatus. The sound reduction process may also not be executed during the execution of the image reproduction process. Even in a case where the sound reduction process is not executed during the execution of the image reproduction process, the foregoing effects of "recording audio data on a monitor sound of a negligible level or audio data that does not represent a monitor sound" can be achieved.

The present embodiment has described the example in which the process for reducing the rotational speed of the fan is performed as the sound reduction process; however, the present embodiment is not limited to this example. For example, in a case where the image display apparatus has a speaker that outputs audio, a process for reducing the volume of the speaker may be executed as the sound reduction process. Both the process for reducing the rotational speed of the fan and the process for reducing the volume of the speaker may be executed as sound reduction processes. The speaker outputs audio based on audio data such as audio data that is input from the image capturing apparatus to the image display apparatus through the recording/reproducing apparatus or audio data reproduced by the recording/reproducing apparatus.

In a case where the automatic fan control mode is set, the rotational speed of the fan may be controlled to a rotational speed higher than the normal rotational speed in S113 shown in FIG. 3.

Embodiment 2

An image display apparatus and a control method thereof according to Embodiment 2 of the present invention are now described hereinafter.

The configurations and processes different from those of Embodiment 1 are described below, and descriptions of the configurations and processes same as those of Embodiment 1 are omitted.

The configuration of a control system according to the present embodiment is the same as that of Embodiment (FIG. 1A).

In the present embodiment, the image capturing apparatus 101 does not have a wireless transmission unit but has a GPS receiver (GPS module). The image capturing apparatus 101 generates GPS position information representing the position of the image capturing apparatus 101 (first position information; shooting position information) based on a signal received by the GPS receiver. The image capturing apparatus 101 outputs the generated shooting position information and the recording process information described in Embodiment 1 to the recording/reproducing apparatus 103.

In the present embodiment, the recording/reproducing apparatus 103 outputs an SDI signal containing the image data, the shooting position information and the recording process information to the image display apparatus 104. The shooting position information and the recording process information are included in the SDI signal as ancillary data.

Figure 4:
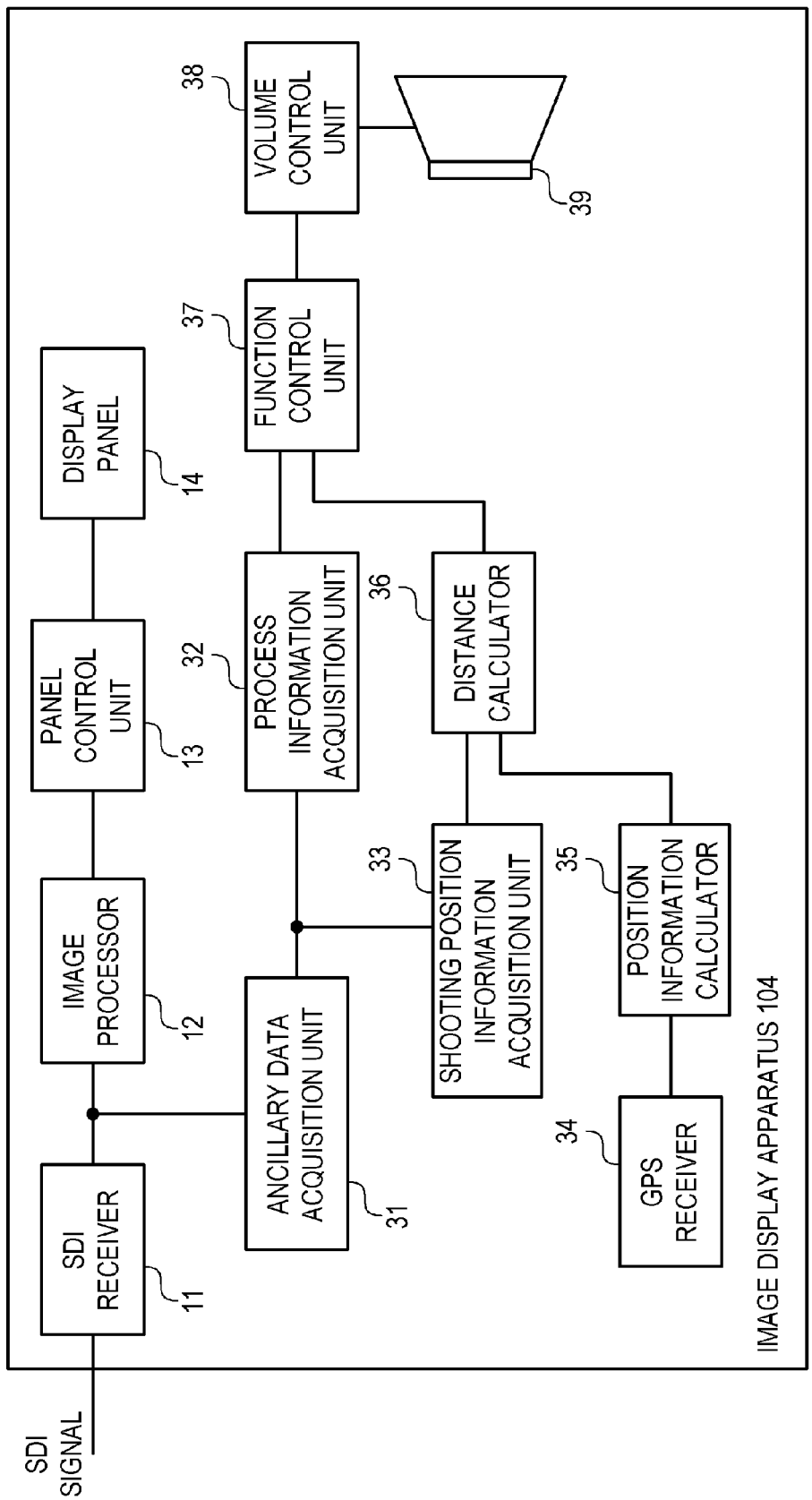
FIG. 4 is a block diagram showing an example of the configuration of the image display apparatus according to Embodiment 2.

FIG. 4 is a block diagram showing an example of the configuration of the image display apparatus 104 according to the present embodiment. In FIG. 4, the same reference numerals as those of Embodiment 1 are used to describe the same functional parts as those of Embodiment (FIG. 2); thus, descriptions thereof are omitted accordingly. As described above, in the present embodiment, the SDI signal containing the image data, the shooting position information and the recording process information is input to the image display apparatus 104. In the present embodiment, therefore, the SDI receiver 11 executes the process for acquiring the recording process information (the first acquisition process) and the process for acquiring the shooting position information (a fourth acquisition process).

It should be noted that at least either the first acquisition process or the fourth acquisition process may be executed by a functional part different from the SDI receiver 11. The recording process information may be input to the image display apparatus 104 by the user. At least either the recording process information or the shooting position information may be acquired directly from the image capturing apparatus 101.

An ancillary data acquisition unit 31 extracts the ancillary data from the SDI signal (decoded SDI signal) that is output from the SDI receiver 11, and outputs the extracted ancillary data to a process information acquisition unit 32 and a shooting position information acquisition unit 33.

The process information acquisition unit 32 extracts the recording process information from the ancillary data that is output from the ancillary data acquisition unit 31, and outputs the extracted recording process information to a function control unit 37.

The shooting position information acquisition unit 33 extracts the shooting position information from the ancillary data that is output from the ancillary data acquisition unit 31, and outputs the extracted shooting position information to a distance calculator 36.

A GPS receiver 34 receives, from three or more GPS satellites, a signal that contains time information of each GPS satellite. The GPS receiver 34 then outputs the time information of each GPS satellite to a position information calculator 35.

The position information calculator 35 acquires GPS position information representing the position of the image display apparatus 104 (second position information; display position information). Specifically, the position information calculator 35 calculates the position of the image display apparatus 104 based on the time information of each GPS satellite that is output from the GPS receiver 34, to generate display position information representing the calculated position. The position information calculator 35 then outputs the display position information to the distance calculator 36. A method for acquiring the display position information is not limited to this method.

The distance calculator 36 generates distance information based on the shooting position information output from the shooting position information acquisition unit 33 and the display position information output from the position information calculator 35. Specifically, the distance between the position represented by the shooting position information and the position represented by the display position information is calculated as the distance between the image capturing apparatus 101 and the image display apparatus 104, and the distance information representing this calculated distance is generated. The distance calculator 36 outputs the distance information to the function control unit 37. In a case where the position of the image capturing apparatus 101 is determined beforehand, the distance between the image capturing apparatus 101 and the image display apparatus 104 may be calculated using only the position of the image display apparatus 104 as a variable.

The function control unit 37 generates a control signal based on the recording process information output from the process information acquisition unit 32 and the distance information output from the distance calculator 36. As will be described hereinafter in detail, the function control unit 37, if needed, generates a control signal that realizes a sound reduction process for reducing the monitor sound. In a case where audio is generated from a monitor speaker 39, this audio output from the monitor speaker 39 is the monitor sound. In the present embodiment, therefore, as a control signal for realizing the sound reduction process, the function control unit 37 generates a control signal that realizes a process for reducing the volume of the monitor speaker 39. The function control unit 37 outputs the generated control signal to a volume control circuit 38.

The volume control circuit 38 controls the volume of the monitor speaker 39 in response to the control signal output from the function control unit 37.

The monitor speaker 39 outputs audio based on, for example, the audio data corresponding to the moving image data input to the image display apparatus 104. The audio data corresponding to the moving image data input to the image display apparatus 104 is included in, for example, the SDI signal input to the SDI receiver 11.

Figure 5:
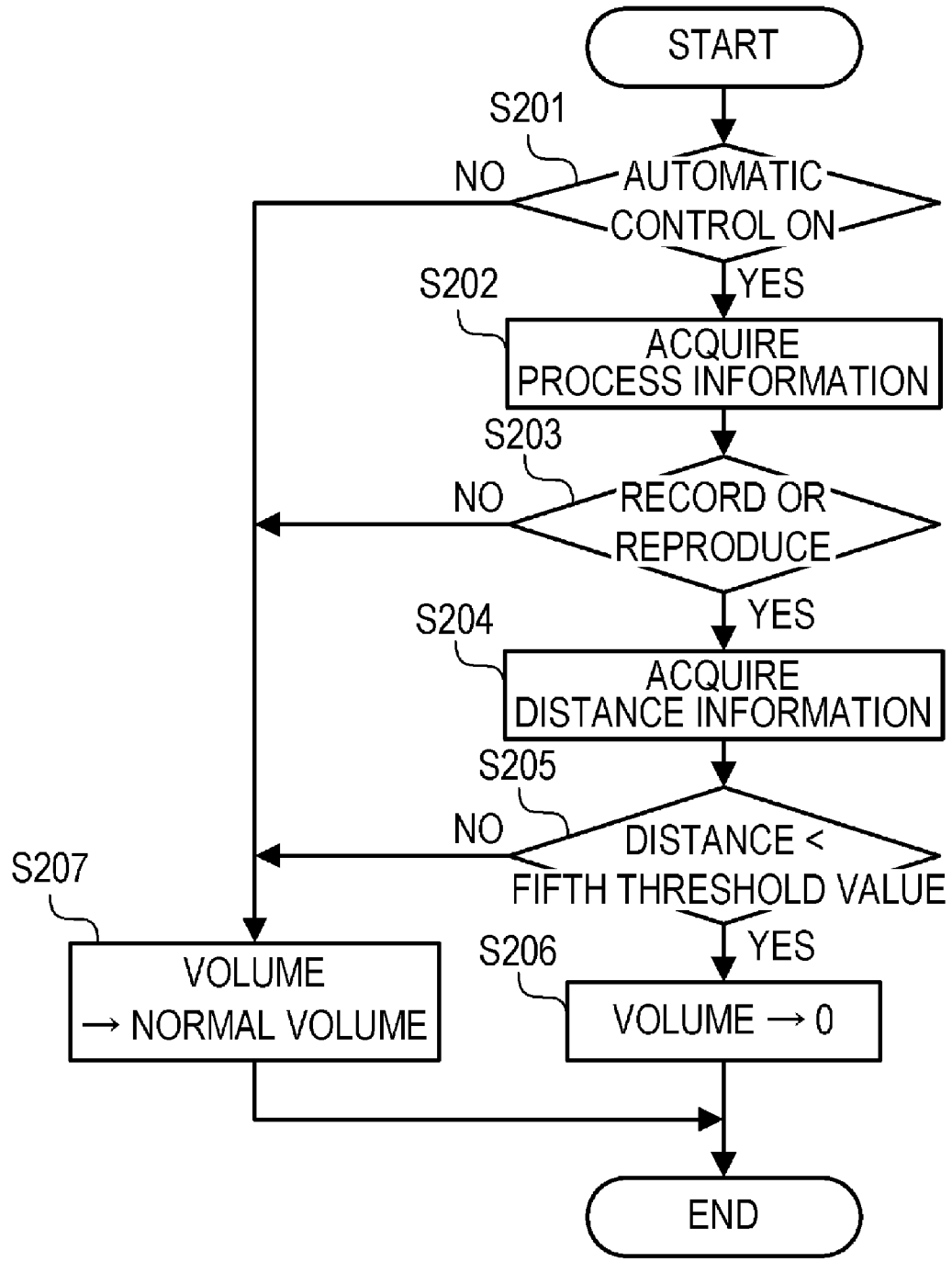
FIG. 5 is a flowchart showing an example of a flow of a process performed by the function control unit according to Embodiment 2.

FIG. 5 is a flowchart showing an example of a flow of a process performed by the function control unit 37.

First, in 5201, the function control unit 37 determines whether an operation mode in which volume control based on the distance information and the recording process information is executed (automatic volume control mode) is set or not. In a case where the automatic volume control mode is set, the process proceeds to S202. In a case where the automatic volume control mode is not set, the process proceeds to S207.

In S207, the function control unit 37 outputs a control signal for controlling the volume of the monitor speaker 39 to a normal volume (e.g., a volume that is set by the user in a case where the user checks an image with sound using the image display apparatus 104). Consequently, the volume of the monitor speaker 39 is controlled to the normal volume.

In S202, the function control unit 37 acquires the recording process information from the process information acquisition unit 32. Subsequently, the process proceeds to S203.

In S203, based on the recording process information acquired in S202, the function control unit 37 determines whether the image recording process is being executed or not. In a case where the image recording process is being executed, there is a possibility that audio data that represents the audio output from the monitor speaker 39 as noise is recorded. However, in a case where the image recording process is not being executed, it is considered that the audio output from the monitor speaker 39 does not have adverse effects on various processes and tasks that use the control system according to the present embodiment. Therefore, in a case where the image recording process is being executed, the process proceeds to S204, and in a case where the image recording process is not being executed, the process proceeds to S207.

As described in Embodiment 1, in a case where the image reproduction process is being executed, there is a high possibility that the user performs a checking task to check the reproduced moving image data. However, in the checking task, generally the reproduced audio data (audio data corresponding to the reproduced moving image data; audio data that represents the audio output from the object during the period of capturing the reproduced moving image data) is checked as well. For this reason, the audio output from the monitor speaker 39 does not have adverse effects on such checking task.

However, there is a possibility that the audio output from the monitor speaker 39 have adverse effects as noise on a checking task in which the user does not check the reproduced audio data but checks only the reproduced moving image data. Thus, in a case where such checking task is to be performed, the process may be advanced to S204. In a case where the image reproduction process for inputting only the reproduced moving image data to the image display apparatus 104 is being executed, there is a high possibility that the user executes a checking task for checking only the reproduced moving image data. Therefore, the image display apparatus 104 determines whether the image reproduction process for inputting only the reproduced moving image data to the image display apparatus 104 is being executed or not. In a case where this image reproduction process is being executed, the process may proceed to S204. Whether the image reproduction process for inputting only the reproduced moving image data to the image display apparatus 104 can be determined based on the reproduction process information representing whether this image reproduction process is executed or not. The reproduction process information can be acquired by various methods, as with the recording process information.

In S204, the function control unit 37 acquires the distance information from the distance calculator 36. Subsequently, the process proceeds to S205.

In S205, the function control unit 37 determines whether the distance that is represented by the distance information acquired in S204 (the distance between the image capturing apparatus 101 and the image display apparatus 104) is less than a fifth threshold value. In a case where the distance between the image capturing apparatus 101 and the image display apparatus 104 is short, audio data on a loud sound output from the monitor speaker 39 is recorded. However, in a case where the distance between the image capturing apparatus 101 and the image display apparatus 104 is sufficiently long, audio data on audio of a negligible level that is generated from the monitor speaker 39 or audio data that does not represent audio output from the monitor speaker 39, can be recorded. Thus, in a case where the distance is less than the fifth threshold value, the process proceeds to S206, and in a case where the distance is equal to or greater than the fifth threshold value, the process proceeds to S207. For example, a distance by which can be obtained audio data representing the audio of the monitor speaker 39 within a permissible range is used as the fifth threshold value. The fifth threshold value may be a value determined beforehand by a manufacturer or the like or a value that can be changed by the user.

In S206, the function control unit 37 outputs a control signal for realizing the sound reduction process. Specifically, the function control unit 37 outputs a control signal for controlling the volume of the monitor speaker 39 to 0 (mute). In this manner, the volume of the monitor speaker 39 is controlled to 0, preventing the audio of the monitor speaker 39 from being input to the microphone 102.

A control signal for controlling the volume of the monitor speaker 39 to a volume lower than the normal volume and higher than 0 may be used as the control signal for realizing the sound reduction process. The volume of the monitor speaker 39 may controlled, in a continuous manner or a step-by-step manner, at a volume that is lower in a case where the distance between the image capturing apparatus 101 and the image display apparatus 104 is long, than that obtained in a case where the distance is short.

As described above, according to the present embodiment, the sound reduction process for reducing the volume of the monitor speaker is executed in a case where the distance between the image capturing apparatus and the image display apparatus is less than the threshold value and the image recording process is being executed. Therefore, the sound reduction process can be executed properly and effectively.

Embodiment 3

An image display apparatus and a control method thereof according to Embodiment 3 are now described hereinafter.

The configurations and processes different from those of Embodiments 1 and 2 are described below; thus, descriptions of the same configurations and processes as those of Embodiments 1 and 2 are omitted accordingly.

The configuration of a control system according to the present embodiment is the same as that of Embodiment (FIG. 1A).

In the present embodiment, the image capturing apparatus 101 generates shooting time information that represents a shooting time corresponding to image data obtained as a result capturing, and outputs the generated shooting time information to the recording/reproducing apparatus 103. The recording/reproducing apparatus 103 then outputs an SDI signal containing the image data and the shooting time information representing the image data capturing time to the image display apparatus 104. The shooting time information is included in the SDI signal as ancillary data.

In the present embodiment, the process information and the shooting position information are not input to the image display apparatus 104.

Figure 6:
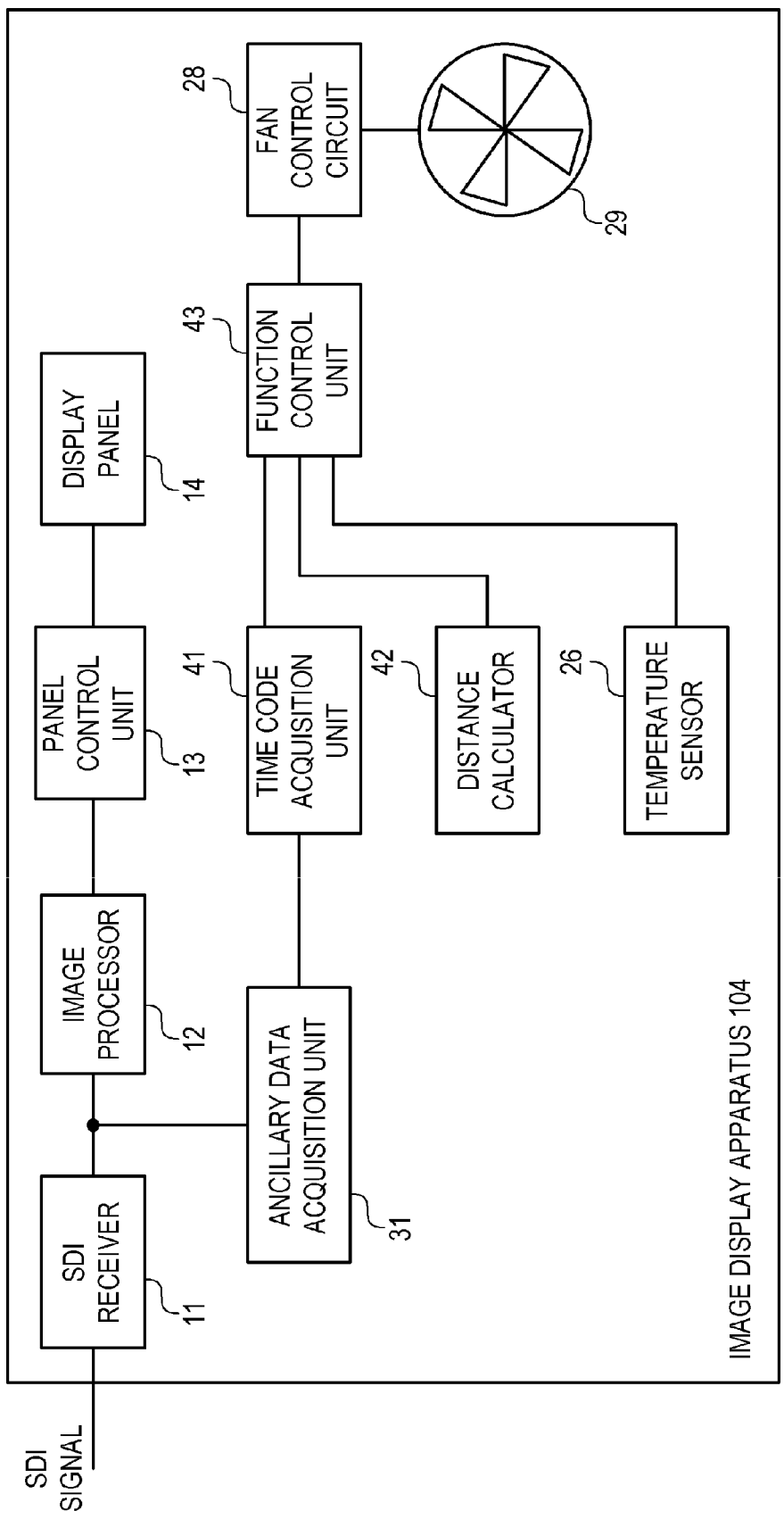
FIG. 6 is a block diagram showing an example of the configuration of the image display apparatus according to Embodiment 3.

FIG. 6 is a block diagram showing an example of the configuration of the image display apparatus 104 according to the present embodiment. In FIG. 6, the same reference numerals as those of Embodiments 1 and 2 are used to describe the same functional parts as those of Embodiments 1 and 2 (FIGS. 2 and 4); thus, descriptions thereof are omitted accordingly. As described above, in the present embodiment, the SDI signal containing the image data and the shooting time information is input to the image display apparatus 104. In the present embodiment, therefore, the SDI receiver 11 acquires the shooting time information.

It should be noted that the process for acquiring the shooting time information may be executed by a functional part different from the SDI receiver 11. The shooting time information may also be acquired directly from the image capturing apparatus 101.

A time code acquisition unit 41 extracts the shooting time information (time code) from the ancillary data output from the ancillary data acquisition unit 31, and outputs the extracted shooting time information to a function control unit 43.

A real-time clock 42 measures the current time to generate current time information representing the current time. The real-time clock 42 then outputs the generated current time information to the function control unit 43.

The function control unit 43 generates a control signal based on the shooting time information output from the time code acquisition unit 41, the current time information output from the real-time clock 42, and the temperature information output from the temperature sensor 26. As will be described hereinafter in detail, the function control unit 43, if needed, generates a control signal that realizes the sound reduction process for reducing the monitor sound. In the present embodiment, as the control signal for realizing the sound reduction process, the function control unit 43 generates a control signal that realizes the process for reducing the rotational speed of the fan 29. The function control unit 43 outputs the generated control signal to the fan control circuit 28.

Figure 7:
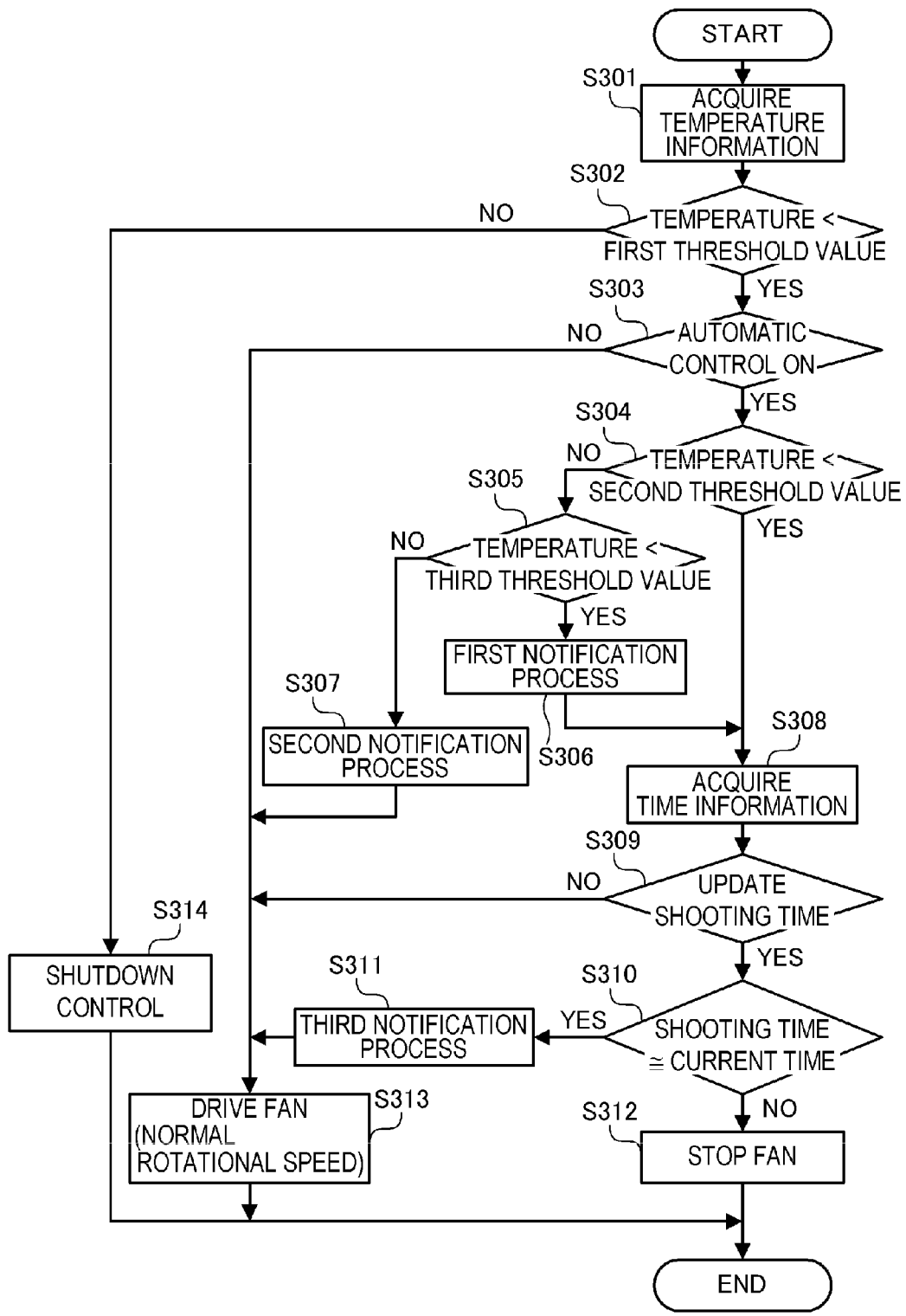
FIG. 7 is a flowchart showing an example of a flow of a process performed by the function control unit according to Embodiment 3.

FIG. 7 is a flowchart showing an example of a flow of a process performed by the function control unit 43.

The processes of S301 to S307 are the same as the processes of S101 to S107 of Embodiment 1 (FIG. 3). The processes of S312 to S314 are the same as the processes of S112 to S114 of Embodiment 1 (FIG. 3). However, in the present embodiment, the automatic fan control mode is an operation mode in which the fan is controlled based on the shooting time information and the current time information. In S304, in a case where it is determined that "the temperature is less than the second threshold value," the process proceeds to S308. After the process of S306 is executed, the process proceeds to S308.

In S308, the function control unit 43 acquires the shooting time information from the time code acquisition unit 41 and acquires the current time information from the real-time clock 42. Subsequently, the process proceeds to S309.

In S309, based on the shooting time information acquired in S308, the function control unit 43 determines whether the shooting time represented by the shooting time information is sequentially updated or not. In a case where the shooting time is updated sequentially, the process proceeds to S310. In a case where the shooting time is not updated sequentially, the process proceeds to S313.

The reason why the process proceeds to S310 in a case where the shooting time is sequentially updated and the process proceeds to S313 in a case where the shooting time is not sequentially updated is now described.

As the shooting time information on moving image data, the SDI receiver 11 and the function control unit 43 acquire, for each of frames of the moving image data, the shooting time information representing a shooting time of the frame. Thus, in a case where the shooting time information on the moving image data is acquired, it is determined that "the shooting time is sequentially updated." In a case where the image reproduction process is being executed, the reproduced moving image data and the shooting time information on the reproduced moving image data are input to the image display apparatus 104. In a case where the image recording process is being executed, usually, moving image data to be recorded and the shooting time information on the moving image data to be recorded are input to the image display apparatus 104. Therefore, in a case where it is determined that "the shooting time is updated sequentially," there is a high possibility that the image reproduction process or the image recording process is executed. In a case where it is determined that "the shooting time is not sequentially updated," there is a possibility that the image reproduction process and the image recording process are not executed.

For this reason, the process proceeds to S310 in a case where the shooting time is updated sequentially and the process proceeds to S313 in a case where the shooting time is not updated sequentially.

In S310, based on the shooting time information and the current time information acquired in S308, the function control unit 43 determines whether the shooting time represented by the shooting time information is substantially equivalent (also meaning completely equivalent) to the current time represented by the current time information. In a case where the shooting time is different from the current time, the process proceeds to S312, and in a case where the shooting time is substantially equivalent to the current time, the process proceeds to S311.

The reason why the process proceeds to S312 in a case where the shooting time is different from the current time and the process proceeds to S311 in a case where the shooting time is substantially equivalent to the current time is now described.

In a case where the image reproduction process is being executed, the shooting time corresponding to the reproduced moving image data is different from the time at which the process of S310 is executed. Also, in a case where the image recording process is being executed, usually, a start time at which moving image data to be recorded is generated is used as the shooting time corresponding to the moving image data to be recorded. In a case where the image recording process is being executed, an image process that is not normally executed is usually executed by the image capturing apparatus 101 in order to generate the moving image data to be recorded. Because such image process takes time, in most cases a time-lag occurs between the shooting time corresponding to the moving image data to be recorded and the time at which the process of S310 is executed. Accordingly, in a case where it is determined that "the shooting time is different from the current time," there is a high possibility that the image reproduction process or the image recording process is being executed. In a case where it is determined that "the shooting time is substantially equivalent to the current time," there is a high possibility that the image reproduction process and the image recording process are not executed and that the state of the image capturing apparatus 101 is in a free-run state. The free-run state is where, for example, capturing is executed sequentially and the image data generated as a result of the sequential capturing are sequentially output without being processed much.

For this reason, the process proceeds to S312 in a case where the shooting time is different from the current time and the process proceeds to S311 in a case where the shooting time is substantially equivalent to the current time.

In S311, the function control unit 43 executes a third notification process. The third notification process issues a notification of inability to detect execution of the image recording process or the image reproduction process from the shooting time information. For instance, in the third notification process, a message that reads, "unable to execute automatic fan control because the time code corresponds to the free-run mode," is displayed on the screen. Subsequently, the process proceeds to S313.

Note that the third notification process may issue a notification of starting the execution of fan control for driving the fan 29 at the normal rotational speed.

As described above, according to the present embodiment, whether to execute the sound reduction process or not is controlled based on the shooting time of image data. Such control can achieve a proper and effective execution of the sound reduction process. Specifically, according to the present embodiment, the sound reduction process is executed in a case where the shooting time is updated sequentially and different from the current time. In a case where the shooting time is updated sequentially and different from the current time, there is a high possibility that the image reproduction process or the image recording process is executed. Thus, according to the present embodiment, the sound reduction process can be executed in a case where there is a high possibility that the image reproduction process or the image recording process is executed.

Embodiment 4

An image display apparatus and a control method thereof according to Embodiment 4 of the present invention are now described hereinafter.

The configurations and processes different from those of Embodiments 1 to 3 are described below, and descriptions of the same configurations and processes as those of Embodiments 1 to 3 are omitted.

The configuration of a control system according to the present embodiment is the same as that of Embodiment 1 (FIG. 1A). As with Embodiment 3, in the present embodiment an SDI signal containing the image data and the shooting time information is input to the image display apparatus 104.

Figure 8:
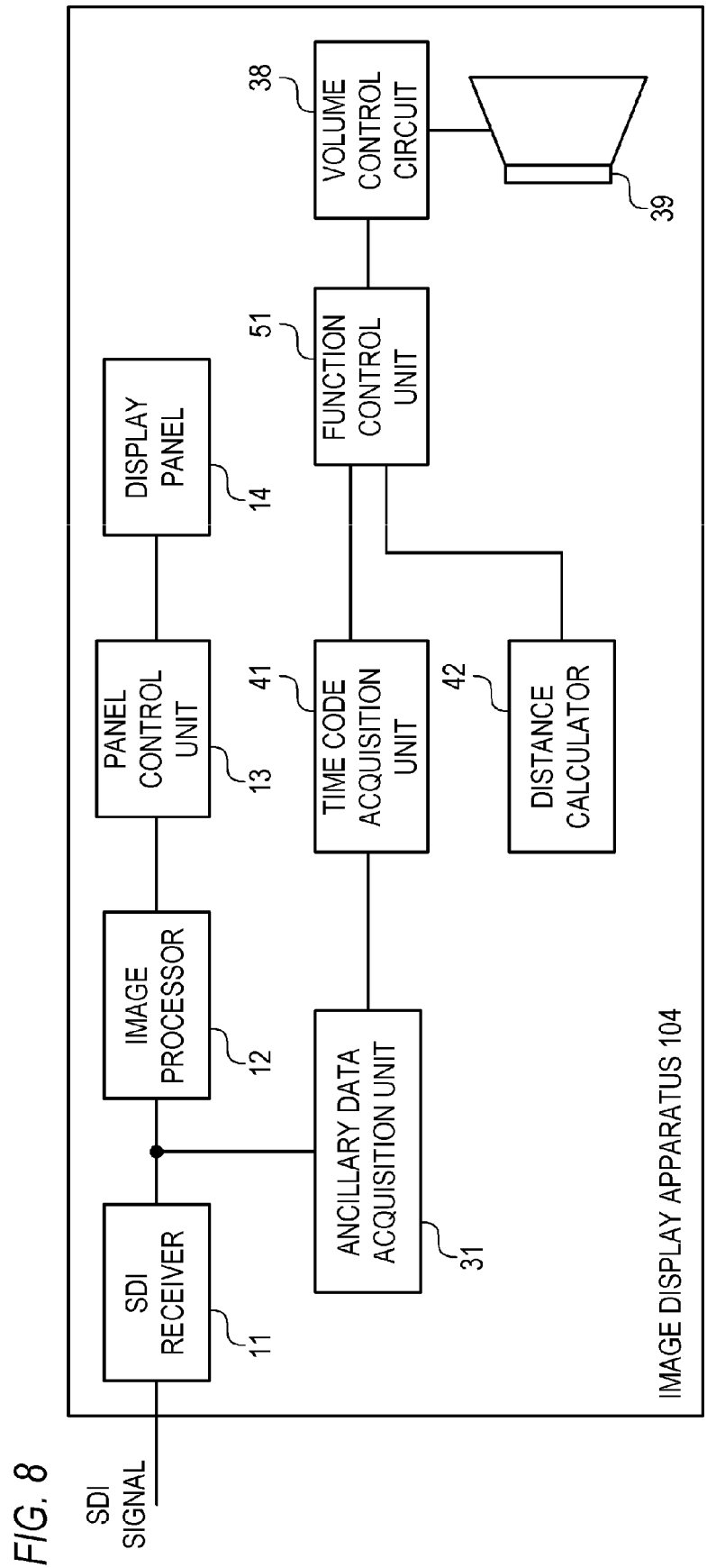
FIG. 8 is a block diagram showing an example of the configuration of the image display apparatus according to Embodiment 4.

FIG. 8 is a block diagram showing an example of the configuration of the image display apparatus 104 according to the present embodiment. In FIG. 8, the same reference numerals as those of Embodiments 1 to 3 are used to describe the same functional parts as those of Embodiments 1 to 3 (FIGS. 2, 4, 6).

A function control unit 51 generates a control signal based on the shooting time information output from the time code acquisition unit 41 and the current time information output from the real-time clock 42. As will be described hereinafter in detail, the function control unit 51, if needed, generates a control signal that realizes the sound reduction process for reducing the monitor sound. In the present embodiment, as the control signal for realizing the sound reduction process, the function control unit 51 generates a control signal that realizes a process for reducing the volume of the monitor speaker 39. The function control unit 51 then outputs the generated control signal to the volume control circuit 38.

Figure 9:
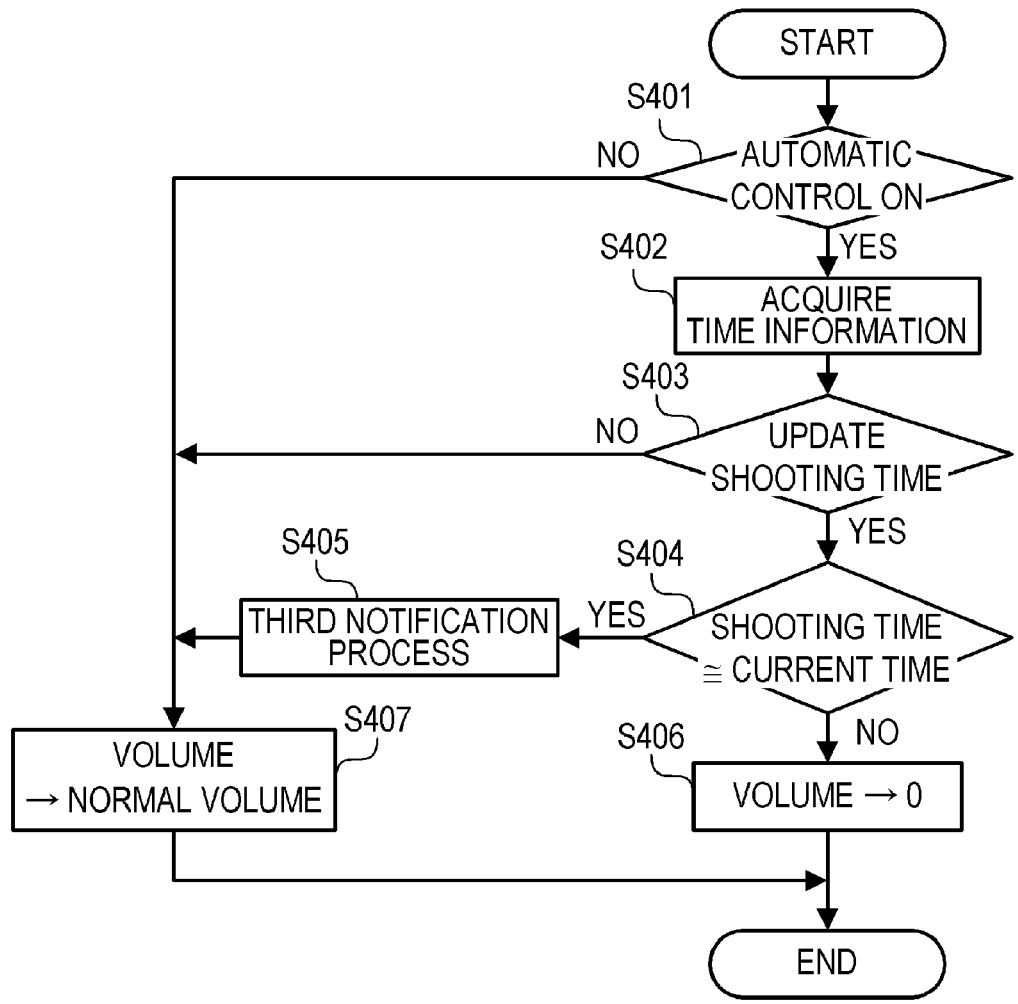
FIG. 9 is a flowchart showing an example of a flow of a process performed by the function control unit according to Embodiment 4.

FIG. 9 is a flowchart showing an example of a flow of a process performed by the function control unit 51. This flowchart is an internal control flowchart.

First, in S401, the function control unit 51 determines whether an operation mode in which volume control based on the shooting time information and the current time information is executed (automatic volume control mode) is set or not. In a case where the automatic volume control mode is set, the process proceeds to S402. In a case where the automatic volume control mode is not set, the process proceeds to S407.

In S407, the function control unit 51 outputs a control signal for controlling the volume of the monitor speaker 39 to the normal volume. Consequently, the volume of the monitor speaker 39 is controlled to the normal volume.

In S402, the function control unit 51 acquires the shooting time information from the time code acquisition unit 41 and acquires the current time information from the real-time clock 42. Subsequently, the process proceeds to S403.

In S403, based on the shooting time information acquired in S402, the function control unit 51 determines whether the shooting time represented by the shooting time information is sequentially updated or not. In a case where the shooting time is sequentially updated, the process proceeds to S404. In a case where the shooting time is not updated sequentially, the process proceeds to S407.

In S404, based on the shooting time information and the current time information acquired in S402, the function control unit 51 determines whether the shooting time represented by the shooting time information is substantially equivalent (also meaning completely equivalent) to the current time represented by the current time information. In a case where the shooting time is different from the current time, the process proceeds to S406. In a case where the shooting time is substantially equivalent to the current time, the process proceeds to S405.

In S405, the function control unit 51 executes the third notification process. For instance, in the third notification process, a message that reads, "unable to execute automatic fan control because the time code corresponds to the free-run mode," is displayed on the screen. Subsequently, the process proceeds to S407.

Note that the third notification process may send, for instance, a notice of starting the volume control for controlling the volume of the monitor speaker 39 to the normal volume.

In S406, the function control unit 51 outputs a control signal for realizing the sound reduction process. Specifically, the function control unit 51 outputs a control signal for controlling the volume of the monitor speaker 39 to 0 (mute). In this manner, the volume of the monitor speaker 39 is controlled to 0, preventing the audio of the monitor speaker 39 from being input to the microphone 102.

As described above, according to the present embodiment, whether to execute the sound reduction process or not is controlled based on the shooting time of image data. Such control can achieve a proper and effective execution of the sound reduction process Embodiment 5

An image display apparatus and a control method thereof according to Embodiment 5 of the present invention are described hereinafter.

The configurations and processes different from those of Embodiments 1 to 4 are described below; thus, descriptions of the same configurations and processes as those of Embodiments 1 to 4 are omitted accordingly.

The configuration of a control system according to the present embodiment is the same as that of Embodiment (FIG. 1A).

In the present embodiment, the image capturing apparatus 101 outputs image data added (superimposed) with recording process information and reproduction process information as metadata, and the image display apparatus 104 acquires the recording process information and the reproduction process information by extracting the metadata from the image data.

Specifically, the image capturing apparatus 101 outputs the image data, the recording process information and the reproduction process information to the recording/reproducing apparatus 103. In so doing, the recording process information and the reproduction process information may or may not be superimposed on the image data as the metadata, and the recording process information and the reproduction process information may be transmitted/received in the form of wireless signals through a route different from that for the image data.

The recording/reproducing apparatus 103 outputs an SDI signal containing the image data, the recording process information and the reproduction process information to the image display apparatus 104.

The recording process information and the reproduction process information are included in the SDI signal as ancillary data.

It can be said that "the ancillary data of the SDI signal containing the image data" is "the metadata superimposed on the image data." The image display apparatus 104 extracts the recording process information and the reproduction process information from the ancillary data.

Figure 10:
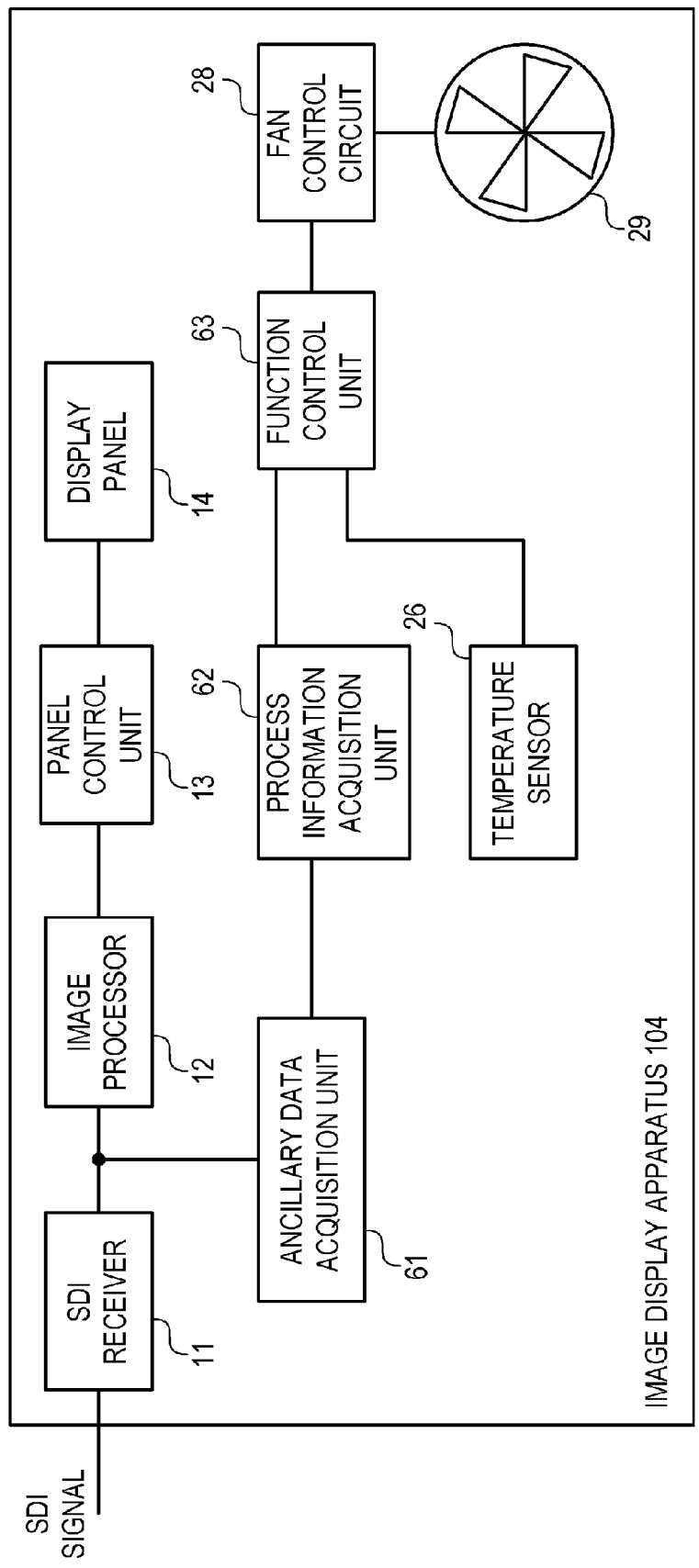
FIG. 10 is a block diagram showing an example of the configuration of the image display apparatus according to Embodiment 5.

FIG. 10 is a block diagram showing an example of the configuration of the image display apparatus 104. In FIG. 10, the same reference numerals as those of Embodiments 1 to 4 are used to describe the same functional parts as those of Embodiments 1 to 4 (FIGS. 2, 4, 6, 8); thus, descriptions thereof are omitted accordingly. As described above, according to the present embodiment, the SDI signal containing the image data and the recording process information is input to the image display apparatus 104. In the present embodiment, therefore, the SDI receiver 11 executes the process for acquiring the recording process information (the first acquisition process).

An ancillary data acquisition unit 61 extracts the ancillary data from the SDI signal (decoded SDI signal) that is output from the SDI receiver 11, and outputs the extracted ancillary data to a process information acquisition unit 62.

The process information acquisition unit 62 extracts the recording process information and the reproduction process information from the ancillary data that is output from the ancillary data acquisition unit 61, and outputs the extracted recording process information and reproduction process information to a function control unit 63.

The recording process information and the reproduction process information may be acquired by means of mutually different methods.

The function control unit 63 generates a control signal based on the process information output from the process information acquisition unit 62 and the temperature information output from the temperature sensor 26. As will be described hereinafter in detail, the function control unit 63, if needed, generates a control signal that realizes the sound reduction process for reducing the monitor sound. In the present embodiment, as the control signal for realizing the sound reduction process, the function control unit 63 generates a control signal that realizes a process for reducing the rotational speed of the fan 29. The function control unit 63 outputs the generated control signal to the fan control circuit 28.

Figure 11:
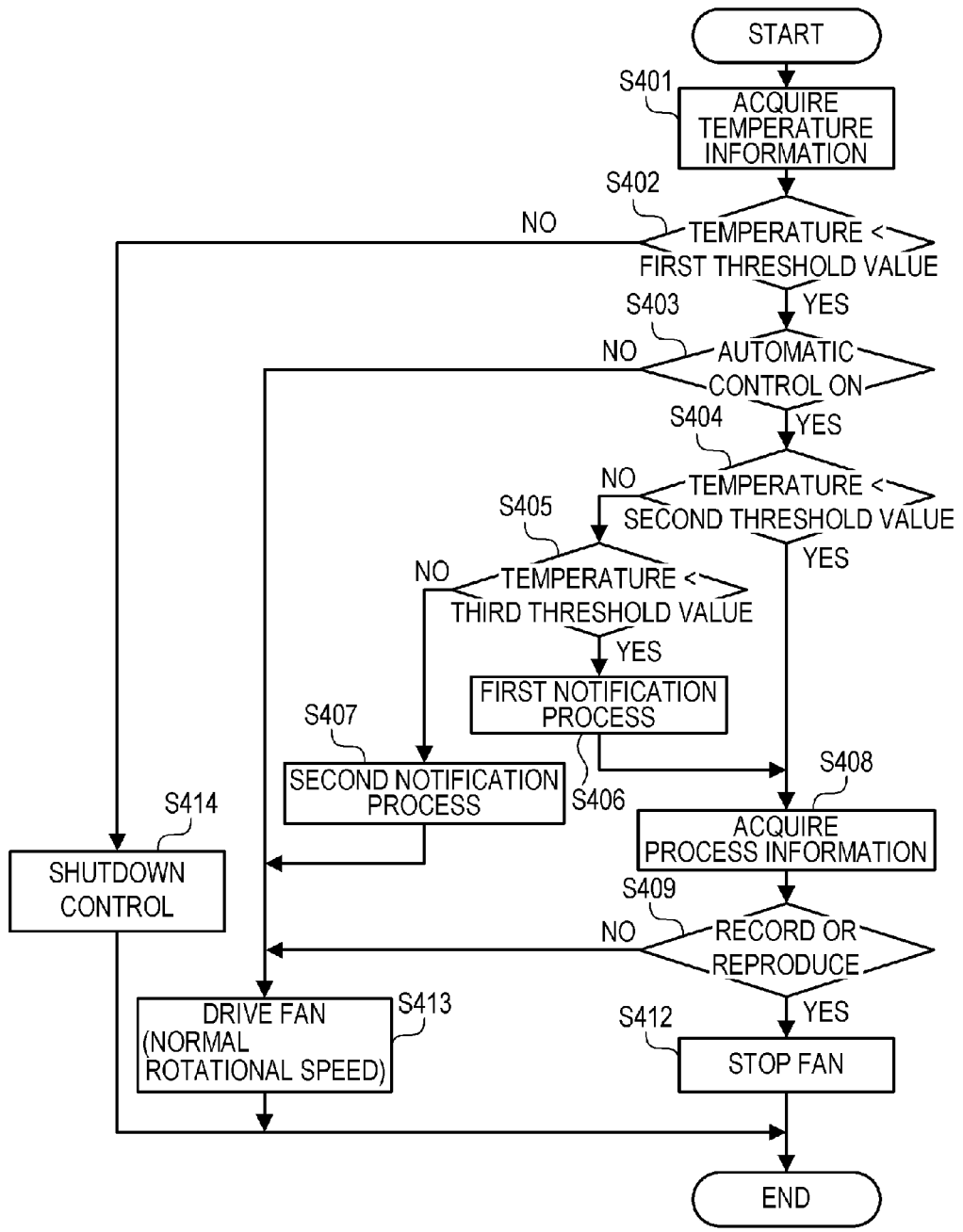
FIG. 11 is a flowchart showing an example of a flow of a process performed by the function control unit according to Embodiment 5.

FIG. 11 is a flowchart showing an example of a flow of a process performed by the function control unit 63.

The processes of S401 to S409 are the same as the processes of S101 to S109 of Embodiment 1 (FIG. 3), and the process of S413 is the same as that of S113 of Embodiment 1. Also, the process of S414 is the same as that of S114 of Embodiment 1. In the present embodiment, the automatic fan control mode is an operation mode in which the fan is controlled based on the process information. In the present embodiment, in a case where it is determined in S409 that "the image recording process or the image reproduction process is being executed," the process of S412 is executed. The process of S412 is the same as that of S112 of Embodiment 1.

As described above, according to the present embodiment, the sound reduction process is executed in a case where the image recording process is being executed. In addition, according to the present embodiment, the sound reduction process is also executed in a case where the image reproduction process is being executed. The present embodiment, therefore, can execute the sound reduction process properly and effectively.

The effects of the present embodiment are now described in detail.

In onset grading, there is an extremely high possibility that the distance between the image capturing apparatus and the image display apparatus is short. Therefore, in a case where the image recording process is being executed, there is an extremely high possibility that audio data on a considerably loud monitor sound is recorded. According to the present embodiment, the sound reduction process is executed in such a case, so that the audio data on a monitor sound of a negligible level or audio data that does not represent a monitor sound can be recorded.

In a case where the image reproduction process is executed, there is an extremely high possibility that a monitor sound has adverse effects on the checking task described in Embodiment 1. According to the present embodiment, the sound reduction process is executed in such a case, preventing a monitor sound from having adverse effects on the checking task.

In other cases, the possibility that a monitor sound has adverse effects on the processes and tasks is extremely low. According to the present embodiment, the sound reduction process is not executed in those cases, preventing unnecessary execution of the sound reduction process.

The present embodiment takes into consideration the internal temperature of the image display apparatus for the purpose of preventing an increase in the internal temperature of the image display apparatus from causing failure in the image display apparatus; however, the internal temperature of the image display apparatus does not have to be taken into consideration. For instance, the processes prior to S408 shown in FIG. 11 (i.e., the processes of S401 to S407 and the process of S414) may be omitted, and instead the processes subsequent to S408 shown in FIG. 11 (i.e., the processes of S408, S409, S412, and S413) may be executed. The same applies to the other embodiments.

The present embodiment has described the example in which the process for reducing the rotational speed of the fan is executed as the sound reduction process; however, the present invention is not limited to this example. For example, in a case where the image display apparatus has a speaker that outputs audio, a process for reducing the volume of the speaker may be executed as the sound reduction process. Both the process for reducing the rotational speed of the fan and the process for reducing the volume of the speaker may be executed as sound reduction processes. The same applies to the other embodiments.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-227069, filed on Nov. 7, 2014, Japanese Patent Application No. 2015-065058, filed on Mar. 26, 2015, and Japanese Patent Application No. 2015-169047, filed on Aug. 28, 2015, which are hereby incorporated by reference herein in their entirety.

What is claimed is:

1. An image display apparatus that is capable of being connected, directly or via a recording apparatus, to an image capturing apparatus, the image display apparatus comprising:
   a fan for lowering an internal temperature of the image display apparatus;
   a processor; and
   a memory storing instructions which, when executed by the processor, cause the image display apparatus to function as:
   (1) a first acquisition unit configured to acquire recording process information on an image recording process for recording, by the image capturing apparatus or the recording apparatus, image data generated by capturing an object with the image capturing apparatus; and (2) a reduction unit configured to execute a sound reduction process in which a rotational speed of the fan is reduced or rotation of the fan is stopped, in response to the image recording process being executed, based on the recording process information.

2. The image display apparatus according to claim 1, wherein the recording process information is metadata added to the image data.

3. The image display apparatus according to claim 1, wherein the recording process information is ancillary data included in a Serial Digital Interface (SDI) signal.

4. The image display apparatus according to claim 1, wherein the first acquisition unit acquires the recording process information from the image capturing apparatus.

5. The image display apparatus according to claim 1, wherein the instructions, when executed by the processor, further cause the image display apparatus to function as:
    a second acquisition unit configured to acquire distance information representing a distance between the image capturing apparatus and the image display apparatus, and
    wherein, based on the distance information and the recording process information, the reduction unit stops executing the sound reduction process in a case where (a) the distance is equal to or greater than a threshold value and (b) the image recording process is being executed, and executes the sound reduction process in a case where (a) the distance is less than the threshold value and (b) the image recording process is being executed.

6. The image display apparatus according to claim 5, wherein the instructions, when executed by the processor, further cause the image display apparatus to function as:
    a reception unit configured to receive a wireless signal transmitted from the image capturing apparatus, and
    wherein the second acquisition unit generates the distance information based on a reception level, which is a level of the wireless signal at timing when the wireless signal is received by the reception unit.

7. The image display apparatus according to claim 5, wherein the instructions, when executed by the processor, further cause the image display apparatus to function as:
    (1) a fourth acquisition unit configured to acquire first position information representing a position of the image capturing apparatus; and
    (2) a fifth acquisition unit configured to acquire second position information representing a position of the image display apparatus, and
    wherein the second acquisition unit generates the distance information based on the first position information and the second position information.

8. An image display apparatus comprising:
    a fan for lowering an internal temperature of the image display apparatus;
    a processor; and
    a memory storing instructions which, when executed by the processor, cause the image display apparatus to function as:
    (1) an acquisition unit configured to acquire shooting time information representing a shooting time of image data generated by capturing an object with an image capturing apparatus; and
    (2) a reduction unit configured to execute a sound reduction process in which a rotational speed of the fan is reduced or rotation of the fan is stopped, based on the shooting time information acquired by the acquisition unit,
    wherein, as shooting time information on the image data, the acquisition unit acquires, for each frame of the image data, shooting time information representing a shooting time of the frame, and
    wherein the reduction unit executes the sound reduction process in a case where the shooting time that is represented by the shooting time information acquired by the acquisition unit is updated sequentially and different from a current time.

9. The image display apparatus according to claim 1, wherein the recording process information is information that indicates an instruction on starting an image recording process for recording, by the image capturing apparatus or the recording apparatus, the image data generated by capturing an object with the image capturing apparatus and audio data representing audio that is input to a microphone during a shooting period of the image data.

10. A control method for an image display apparatus that is capable of being connected, directly or via a recording apparatus, to an image capturing apparatus, the image display apparatus having a fan for lowering an internal temperature of the image display apparatus, and the control method comprising:
    an acquisition step of acquiring recording process information on an image recording process for recording, by the image capturing apparatus or the recording apparatus, image data generated by capturing of an object with the image capturing apparatus; and
    a reduction step of executing a sound reduction process in which a rotational speed of the fan is reduced or rotation of the fan is stopped, in response to the image recording process being executed, based on the recording process information.

11. A control method for an image display apparatus having a fan for lowering an internal temperature of the image display apparatus, the control method comprising:
    an acquisition step of acquiring shooting time information representing a shooting time of image data generated by capturing an object with an image capturing apparatus; and
    a reduction step of executing a sound reduction process in which a rotational speed of the fan is reduced or rotation of the fan is stopped, based on the shooting time information acquired in the acquisition step,
    wherein, as shooting time information on the image data, the acquisition step acquires, for each frame of the image data, shooting time information representing a shooting time of the frame, and
    wherein the reduction step executes the sound reduction process in a case where the shooting time that is represented by the shooting time information acquired in the acquisition step is updated sequentially and different from a current time.

12. The image display apparatus according to claim 1, wherein the sound reduction process is a process to reduce the rotational speed of the fan.

13. The image display apparatus according to claim 1, wherein the sound reduction process is a process to stop rotation of the fan.

14. The image display apparatus according to claim 1, wherein the reduction unit executes the sound reduction process for a predetermined period, in response to the image recording process being executed.

15. The image display apparatus according to claim 1, wherein the image data is moving image data.

16. An image display apparatus that is capable of being connected, directly or via a recording apparatus, to an image capturing apparatus, the image display apparatus comprising:
 a fan for lowering an internal temperature of the image display apparatus;
 a processor; and
 a memory storing instructions which, when executed by the processor, cause the image display apparatus to function as:
 (1) an acquisition unit configured to acquire information indicating an instruction for recording image data generated by capturing an object with the image capturing apparatus, the information being generated by the image capturing apparatus; and
 (2) a control unit configured to start control of reducing a rotational speed of the fan or stopping rotation of the fan, in response to the information acquired by the acquisition unit.

17. The image display apparatus according to claim 16, wherein the information is metadata added to the image data.

18. The image display apparatus according to claim 16, wherein the information is ancillary data included in a Serial Digital Interface (SDI) signal.

19. The image display apparatus according to claim 16, wherein the information indicates an instruction for start of recording the image data generated by capturing an object with the image capturing apparatus and audio data representing audio that is input to a microphone during a shooting period of the image data.

20. The image display apparatus according to claim 16, wherein the control unit starts control of reducing the rotational speed of the fan, in response to the information acquired by the acquisition unit.

21. The image display apparatus according to claim 16, wherein the control unit starts control of stopping rotation of the fan, in response to the information acquired by the acquisition unit.

22. The image display apparatus according to claim 16, wherein the control unit executes control of reducing the rotational speed of the fan for a predetermined period or stopping rotation of the fan for the predetermined period, in response to the information acquired by the acquisition unit.

23. The image display apparatus according to claim 16, wherein the image data is moving image data.

* * * * *